(12) United States Patent
Kaufmann et al.

(10) Patent No.: US 10,661,352 B2
(45) Date of Patent: May 26, 2020

(54) PARTING LATHE TOOL

(71) Applicant: Kennametal Inc., Latrobe, PA (US)

(72) Inventors: Igor Kaufmann, Nürnberg (DE); Fabian Birkmann, Schwaig b. Nbg (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/971,055

(22) Filed: May 4, 2018

(65) Prior Publication Data
US 2018/0326500 A1 Nov. 15, 2018

(30) Foreign Application Priority Data
May 10, 2017 (DE) .................. 10 2017 110 132

(51) Int. Cl.
| B23B 29/04 | (2006.01) |
| B23B 27/10 | (2006.01) |
| B23Q 11/10 | (2006.01) |
| B23B 27/08 | (2006.01) |
| B23B 27/04 | (2006.01) |

(52) U.S. Cl.
CPC ............ B23B 27/10 (2013.01); B23B 27/04 (2013.01); B23B 27/083 (2013.01); B23B 27/086 (2013.01); B23B 29/043 (2013.01); B23B 2200/3627 (2013.01); B23B 2250/12 (2013.01); B23B 2260/0785 (2013.01); B23Q 11/10 (2013.01)

(58) Field of Classification Search
CPC ....... B23B 27/10; B23B 27/04; B23B 27/045; B23B 27/14; B23B 27/16; B23B 27/1607; B23B 27/1625; B23B 27/1637; B23B 27/22; B23B 29/043; Y10T 407/25; Y10T 407/14
See application file for complete search history.

(56) References Cited

U.S. PATENT DOCUMENTS

| 5,718,156 | A | * | 2/1998 | Lagrolet | ................. B23B 27/10 407/11 |
| 5,901,623 | A | * | 5/1999 | Hong | ..................... B23B 27/10 407/100 |
| 2002/0127067 | A1 | * | 9/2002 | Lagerberg | ............. B23B 29/046 407/11 |
| 2013/0129428 | A1 | * | 5/2013 | Henry | ..................... B23B 27/04 407/11 |
| 2014/0030033 | A1 | * | 1/2014 | Luik | ...................... B23B 27/10 407/11 |
| 2015/0352640 | A1 | * | 12/2015 | Frota de Souza Filho | ................. B23B 27/10 407/11 |
| 2016/0175938 | A1 | * | 6/2016 | Kaufmann | ............. B23B 27/10 407/11 |
| 2016/0339523 | A1 | * | 11/2016 | Graf | ........................ B23B 27/10 |

* cited by examiner

*Primary Examiner* — Nicole N Ramos
(74) *Attorney, Agent, or Firm* — Larry R. Meenan (57) ABSTRACT

A parting lathe tool for machining metal is described. This has a clamping seat for receiving a cutting insert and an internal coolant supply system for supplying coolant to a cutting zone. In this case, the coolant supply system comprises at least three coolant outlets. The coolant outlets are fluidically connected to a coolant supply port via at least two separate coolant lines running within the parting lathe tool.

15 Claims, 8 Drawing Sheets

PARTING LATHE TOOL

CROSS-REFERENCE TO RELATED APPLICATIONS

This application claims priority pursuant to 35 U.S.C. § 119(a) to German Patent Application No. 102017110132.2 filed May 10, 2017, which is incorporated by reference in its entirety.

FIELD

The invention relates to a parting lathe tool for machining metal, with a clamping seat for receiving a cutting insert and with an internal coolant supply system for supplying a cutting zone with coolant comprising at least one coolant line running in the parting lathe tool.

BACKGROUND

Parting lathe tools are known in the prior art. They are used for severing workpieces clamped in a lathe. Parting lathe tools can also be used for producing grooves. For this purpose, these tools are available in different widths, which usually correspond to a groove width to be produced.

As is the case with other cutting tools for metal cutting, an effort is also made with parting lathe tools to give them good cutting properties so that a high machining rate and thus a fast execution of a production task can be guaranteed. At the same time, a long service life of the cutting tools is sought.

For this purpose, coolant supply systems are known by means of which a cutting zone and tool parts close to the cutting zone can be cooled. In particular, cutting edges and other tool parts in direct contact with the workpiece are hereby cooled.

A cutting tool is normally supplied with coolant or cooling lubricant via an internal cooling system within the lathe which usually provides a fixed coolant pressure.

In contrast to other cutting tools, especially those with larger volumes, parting lathe tools do however have the problem that they are particularly flat, especially in the areas to be cooled. For this reason, the coolant lines running within a parting lathe tool are subject to geometrically narrow limits. This applies in particular to the feasible cross-sections of the coolant lines. This means that the supply of coolant to a cutting zone is limited.

SUMMARY

The object of the invention is to further improve a parting lathe tool of the aforementioned type. In particular, a parting lathe tool is presented which has particularly good cutting properties.

The object is achieved by a parting lathe tool of the aforementioned type in which the coolant supply system has at least three coolant outlets, wherein the coolant outlets are fluidically connected to a coolant supply port via at least two separate coolant lines running within the parting lathe tool. To each of the coolant lines, one or more coolant outlets are thus assigned. The assigned coolant outlets are supplied with coolant via the coolant line. For this purpose, the coolant line fluidically connects the coolant outlets assigned to it to the coolant supply port. Separate coolant lines means that along their entire length the coolant lines do not share any line sections, that is, from the coolant supply port as far as the coolant outlets assigned to the coolant line. In an exemplary parting lathe tool with exactly three coolant outlets and exactly two coolant lines, two of the coolant outlets are thus fluidically connected to the coolant supply port via a first coolant line and a third coolant outlet via a second coolant line. The first and second coolant lines are separate, in other words, they do not share any line sections. The parting lathe tool can also be referred to as a cutting lathe tool or a grooving tool. In addition, for the sake of easy readability the term coolant will also be taken to include cooling lubricant. The coolant supply port represents the coolant inlet of the internal coolant supply system of the parting lathe tool. The parting lathe tool preferably only comprises one coolant supply port. However, if so required, several can also be used. The coolant supply port preferably takes the form of a hole or slot. However, other geometries are also possible. As already mentioned, the cross-sections of coolant lines of known parting lathe tools are limited due to the geometry of such tools. Furthermore they are limited due to manufacturing conditions, since they are usually drilled. They must therefore be correspondingly accessible and have a substantially round cross-section. The pressure at which coolant can be introduced into a cutting zone is also determined outside the tool. A coolant volume flow with which the cutting zone can be supplied is thus also substantially limited in the prior art. As a consequence, certain feasible cutting capacities, for example, machining rates and tool lives, emerge. Due to the at least three coolant outlets according to the invention, which are supplied via at least two separate coolant lines, this restriction is lifted and, under the given constraints, the cutting zone can be supplied with a significantly higher coolant volume flow than is possible in the prior art. In addition, at least two of the flow paths for coolant to the three coolant outlets are independent of each other starting at the coolant supply port. In this way, a particularly effective cooling and particularly good cutting performances can be achieved.

Each of the coolant outlets can also be fluidically connected to the coolant supply port via a separate coolant line running within the parting lathe tool. A coolant line is thus assigned to each coolant outlet. The coolant outlet is supplied with coolant via this coolant line. Consequently, the cutting zone can be supplied at a particularly high coolant flow rate. This yields a particularly good cooling effect and particularly high cutting performances.

According to one embodiment, a first coolant outlet is provided in a clamping face of the clamping seat. During operation, coolant can thus flow out of the clamping face. In the process, the coolant is directed directly onto or into a cutting insert, thereby cooling it particularly effectively.

In the process, the first coolant outlet may be designed to be fluidically connected to a coolant inlet of a cutting insert. Such cutting inserts are known from the prior art. They include a coolant duct that runs inside the cutting insert and a coolant outlet in the vicinity of a cutting edge. In this way, the cutting zone and the cutting edge can be cooled particularly well, so that high cutting performances can be achieved.

According to one development, a second coolant outlet is provided in the end face of the parting lathe tool at the workpiece end. In operation, the end face thus points toward a workpiece to be machined and thus toward the cutting zone. This means that coolant can be introduced into the cutting zone from the associated coolant outlet. At the same time, the second coolant outlet is considerably separated from the first coolant outlet. In this way, a weakening of the structure of the parting lathe tool is largely avoided, so that it has sufficient mechanical stability. In addition, coolant can be introduced into the cutting zone via the second coolant outlet from a different direction than the first coolant outlet. This results in an efficient and effective dissipation of heat.

Here, the second coolant outlet, considered in a mounted state of the parting lathe tool, can be arranged below the clamping seat. The mounted state is the state in which the parting lathe tool is mounted in a lathe. The second coolant outlet can be assigned to a free face of a cutting insert. Coolant flowing out of the second coolant outlet can thus flow against the free face. This enables a particularly good cooling of the cutting zone with the known effects.

In one variant, a third coolant outlet is provided on a workpiece-side end face of a clamping lug of the clamping seat. In operation, the end face thus points toward the workpiece to be machined. Starting from the third coolant outlet, coolant can thus be introduced into the cutting zone. In this context, the third coolant outlet is separated from the first and second coolant outlets. This results in the aforementioned effects on the mechanical structure of the parting lathe tool and the cooling of the cutting zone.

Preferably, the third coolant outlet, considered in the mounted state of the parting lathe tool, is arranged above the clamping seat. The mounted state is the state in which the parting lathe tool is mounted in a lathe. The third coolant outlet can here be assigned to a cutting face of a cutting insert. Coolant flowing out of the third coolant outlet can thus flow onto the cutting face. In this way, a particularly good cooling of the cutting zone with the known effects is achieved.

A cutting insert, preferably an indexable insert, can be accommodated in the clamping seat. The cutting insert can then be made from another material better suited for machining than the tool body of the parting lathe tool. The cutting insert can also be selected and replaced substantially independently of the tool body. This enables particularly good machining results to be achieved. The cutting insert can comprise an internal coolant duct that is supplied with coolant via the first coolant outlet. For this purpose, the coolant duct is fluidically connected to the first coolant outlet.

According to one embodiment, the parting lathe tool is a cutting blade. The term 'cut-off blade' is often used for this. Such cut-off blades can be mounted in standard toolholders.

Alternatively, the parting lathe tool can include a tool shank with a substantially rectangular, especially square, cross-section. Such tool shanks are common in turning tools. The same applies to the corresponding toolholders on lathes. The turning tools can therefore be used in different lathes without any problems. In addition, a parting lathe tool can be attached simply and reliably to a lathe via the tool shank with a substantially rectangular cross-section.

According to one development at least one of the coolant lines here consists of a substantially linear coolant line section with a substantially circular cross-section. A coolant line section of this kind can be drilled. This makes it easy and inexpensive to produce. In extreme cases, all coolant lines of the cutting lathe tool can be put together from drilled coolant line sections. As a rule, each coolant line will then comprise a plurality of such sections.

Furthermore, at least one of the coolant lines can include a coolant line section produced by a generative manufacturing process. Such coolant line sections are subject to fewer manufacturing constraints than drilled coolant line sections. In particular, generatively produced sections may be curvilinear. In this context, even the entire parting lathe tool can be produced using a generative manufacturing process. All of the coolant lines are then produced using a generative manufacturing process. Combined manufacture of coolant lines is also possible. Certain coolant line sections can then be produced conventionally, for example, drilled, and other coolant line sections produced generatively. Of course, even with a generative manufacturing method, linear coolant line sections with a circular cross-section can be produced.

The coolant line section produced by a generative manufacturing process can have a cross-section that differs from a circular cross-section. The cross-section can be polygonal or oval. In this way, a relatively large cross-sectional area can be combined with a relatively small cross-sectional extension, at least in one dimension. This makes it possible to provide large cross-sectional areas in confined spaces and thus to convey coolant at relatively high flow rates into areas to be cooled.

BRIEF DESCRIPTION OF THE DRAWINGS

The invention is explained below with reference to various embodiments which are shown in the accompanying drawings. In the figures.

DETAILED DESCRIPTION

Figure 1:
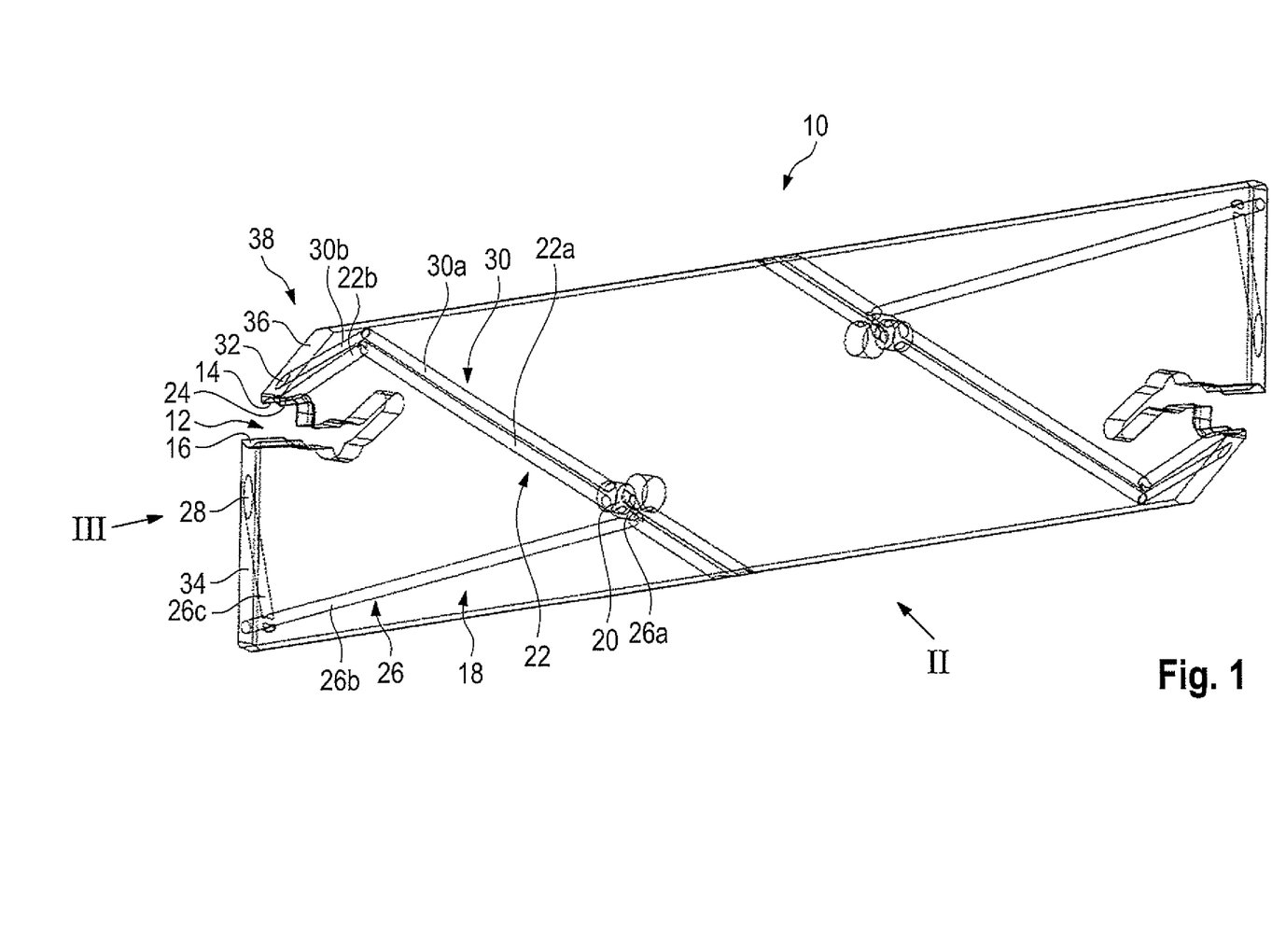
FIG. 1 a parting lathe tool according to the invention in a first embodiment in a perspective view, FIG. 2 the parting lathe tool from FIG. 1 in a side view along direction II, FIG. 3 the parting lathe tool from FIG. 1 in a frontal view along direction III, FIG. 4 a variant of the parting lathe tool from FIG. 1 in a broken perspective view, FIG. 5 a parting lathe tool according to the invention according to a second embodiment in a perspective view, FIG. 6 the parting lathe tool from FIG. 5 in a side view along direction VI, FIG. 7 the parting lathe tool from FIG. 5 in a frontal view along direction VII, FIG. 8 a parting lathe tool according to the invention in a third embodiment in a perspective view, FIG. 9 the parting lathe tool from FIG. 8 in a side view along direction IX, FIG. 10 the parting lathe tool from FIG. 8 in a frontal view along direction X, FIG. 11 the parting lathe tool from FIG. 8 in a perspective view cut along the plane X-X, and FIG. 12 the parting lathe tool from FIG. 8 in a sectional view X-X.
Figure 2:
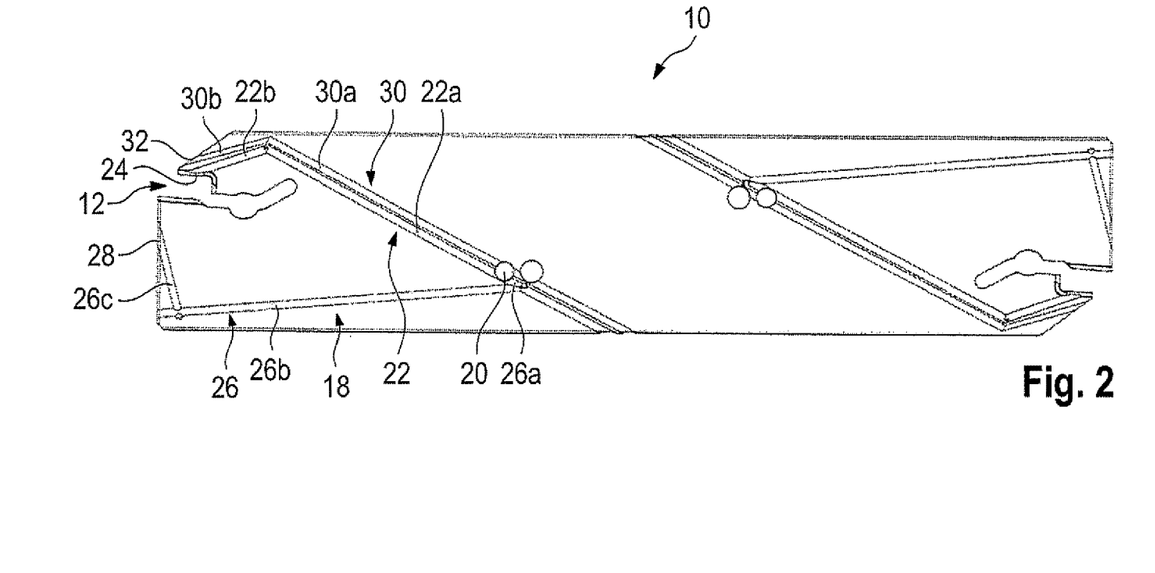
Figure 3:
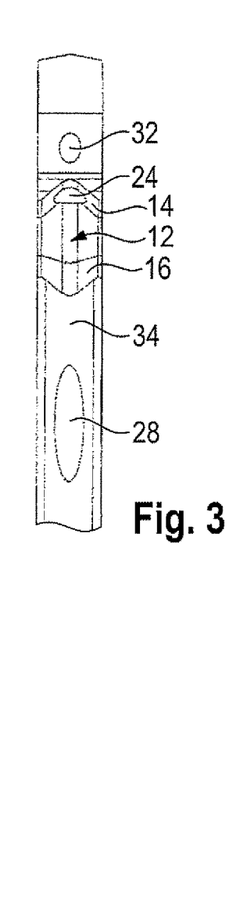

FIGS. 1 to 3 show a parting lathe tool 10 for machining metal.

The parting lathe tool 10 can also be referred to as a cutting lathe tool.

The parting lathe tool 10 comprises a clamping seat 12 to accommodate a cutting insert that is not shown in more detail and which can in particular be an indexable insert. This is basically made up of two clamping faces 14, 16 between which the cutting insert can be clamped.

The parting lathe tool 10 also includes an internal coolant supply system 18 for supplying coolant to a cutting zone.

For this purpose, a coolant supply port 20 is provided on the parting lathe tool 10 on the toolholder side or on the lathe side.

This is designed as a substantially circular hole and can be fluidly connected to a coolant supply outside the parting lathe tool 10.

In other words, the parting lathe tool 10 is supplied with coolant via the coolant supply port 20.

The coolant supply port 20 is fluidically connected to a first coolant outlet 24 via a first coolant line 22, to a second coolant outlet 28 via a second coolant line 26 and to a third coolant outlet 32 via a third coolant line 30.

The coolant lines 22, 26, 30 are fluidically connected to the respectively associated coolant outlets 24, 28, 32.

In addition, they run inside the parting lathe tool 10.

The first coolant outlet 24 is provided on the first clamping face 14.

Here it is designed to be fluidically connected to a coolant inlet of the cutting insert which is not shown in more detail. Additional coolant lines via which the coolant can be introduced into the cutting zone can be provided for this purpose in the cutting insert itself.

Alternatively, the cutting insert can also be supplied solely with coolant via the coolant outlet 24.

The second coolant outlet 28 is provided on one end face 34 on the workpiece side of the parting lathe tool 10.

When the parting lathe tool 10 is mounted in a lathe, the second coolant outlet 28 is located below the clamping seat 12. This situation is illustrated in FIG. 1.

Here, the second coolant outlet 28 is assigned to a free area of the cutting insert, which is not shown, and serves to supply it with a flow of coolant.

The third coolant outlet 32 is arranged on one workpiece-side end face 36 of a clamping lug 38 of the clamping seat 12.

When the parting lathe tool 10 is mounted in a lathe, the third coolant outlet 32 will be located above the clamping seat 12.

The third coolant outlet 32 is assigned to a cutting face of the cutting insert, which is not shown. The cutting face can be supplied with a flow of coolant via the third coolant outlet 32.

In the embodiment according to FIGS. 1 to 3, the coolant line 26 is made of three linear coolant line sections 26a, 26b and 26c. These are substantially circular in cross-section.

The coolant line sections 26a, 26b, 26c are holes.

The same applies to coolant line 22, which is composed of coolant line sections 22a and 22b.

The coolant line 30 comprises coolant line sections 30a and 30b which also extend in a straight line and are substantially circular in cross-section.

Figure 4:
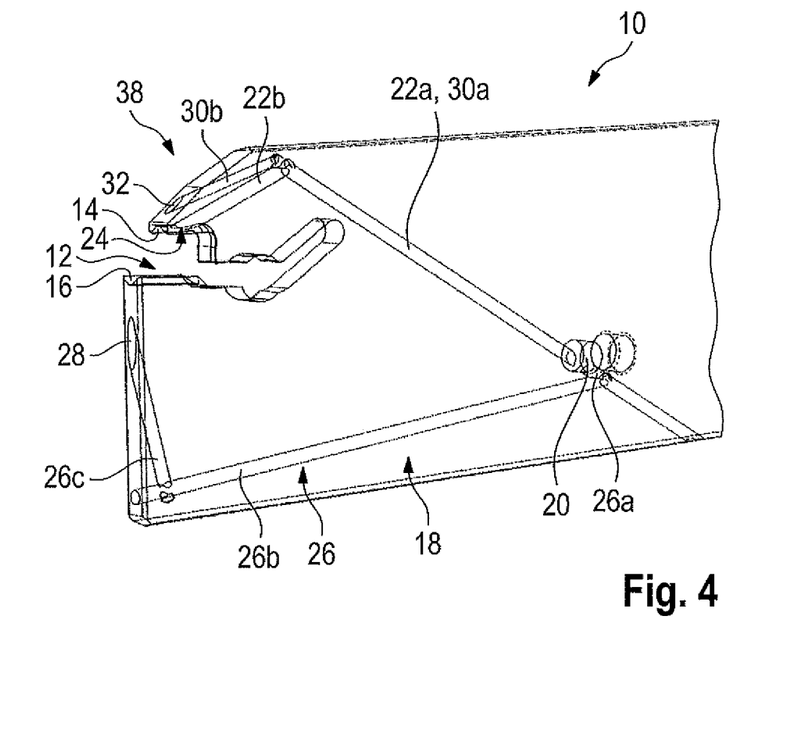

In a variant of the first embodiment shown in FIG. 4, the coolant line sections 22a, 30a are designed as a single coolant line section which, at a certain distance from the coolant supply port 20, branches off into the coolant line sections 22b, 30b. In other words, coolant outlets 24, 32 are supplied with coolant via a common coolant line which is formed by the coolant line section designated 22a and 30a.

Such a parting lathe tool then comprises a total of two coolant lines, namely the coolant line section designated 22a and 30a, and the coolant line 26, and three coolant outlets 24, 28, 32.

The parting lathe tool 10 shown is designed as a so-called indexable tool. This means that a second clamping seat is provided on the parting lathe tool 10 and is point-symmetrical with respect to the above-described clamping seat 12. Since the two clamping seats and the associated coolant supply system are identical in design, a separate explanation will be dispensed with.

Of course, the parting lathe tool 10 in one variant can also have just one single clamping seat 12 and just one single coolant supply system 18.

Figure 5:
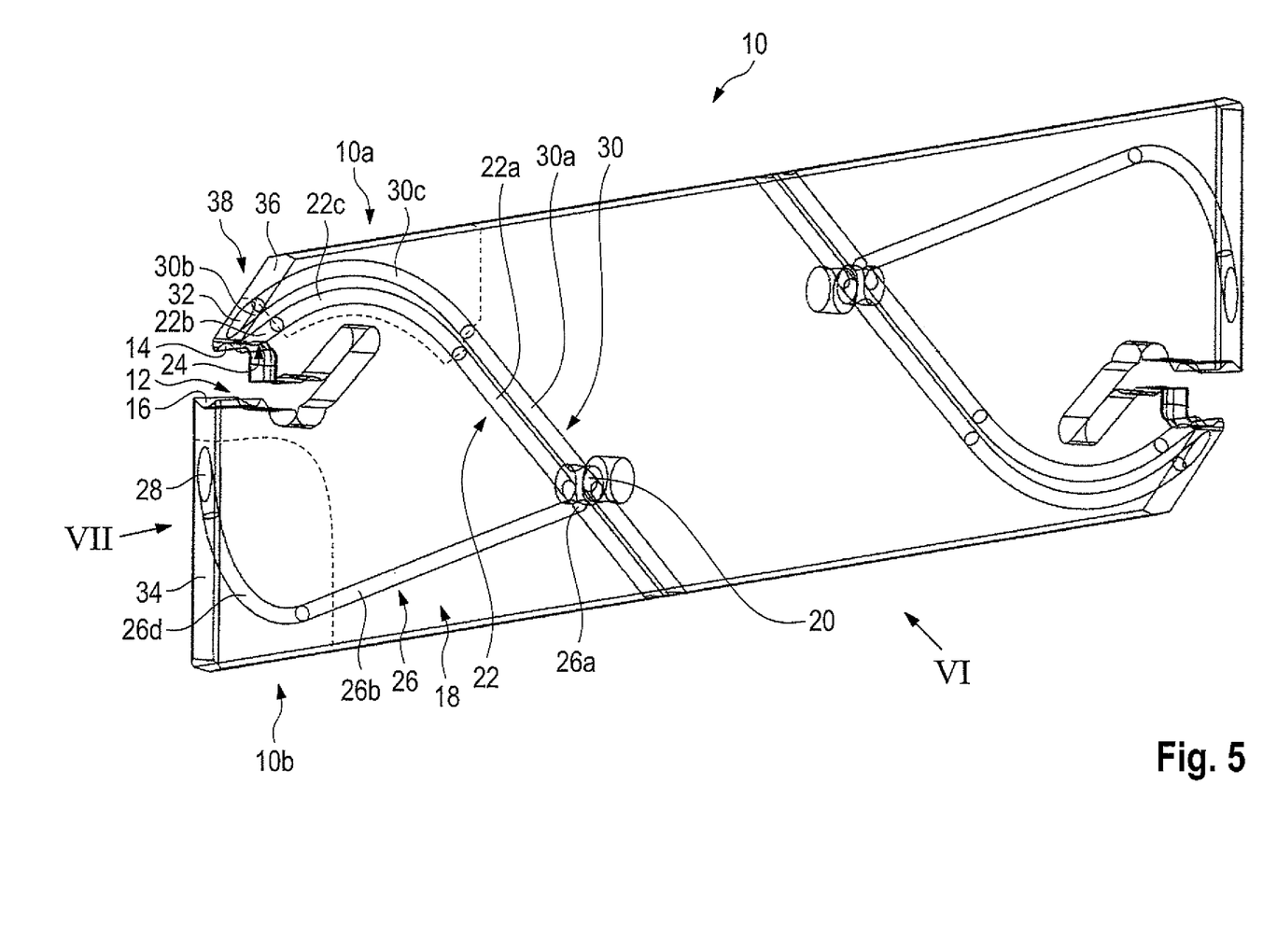
Figure 6:
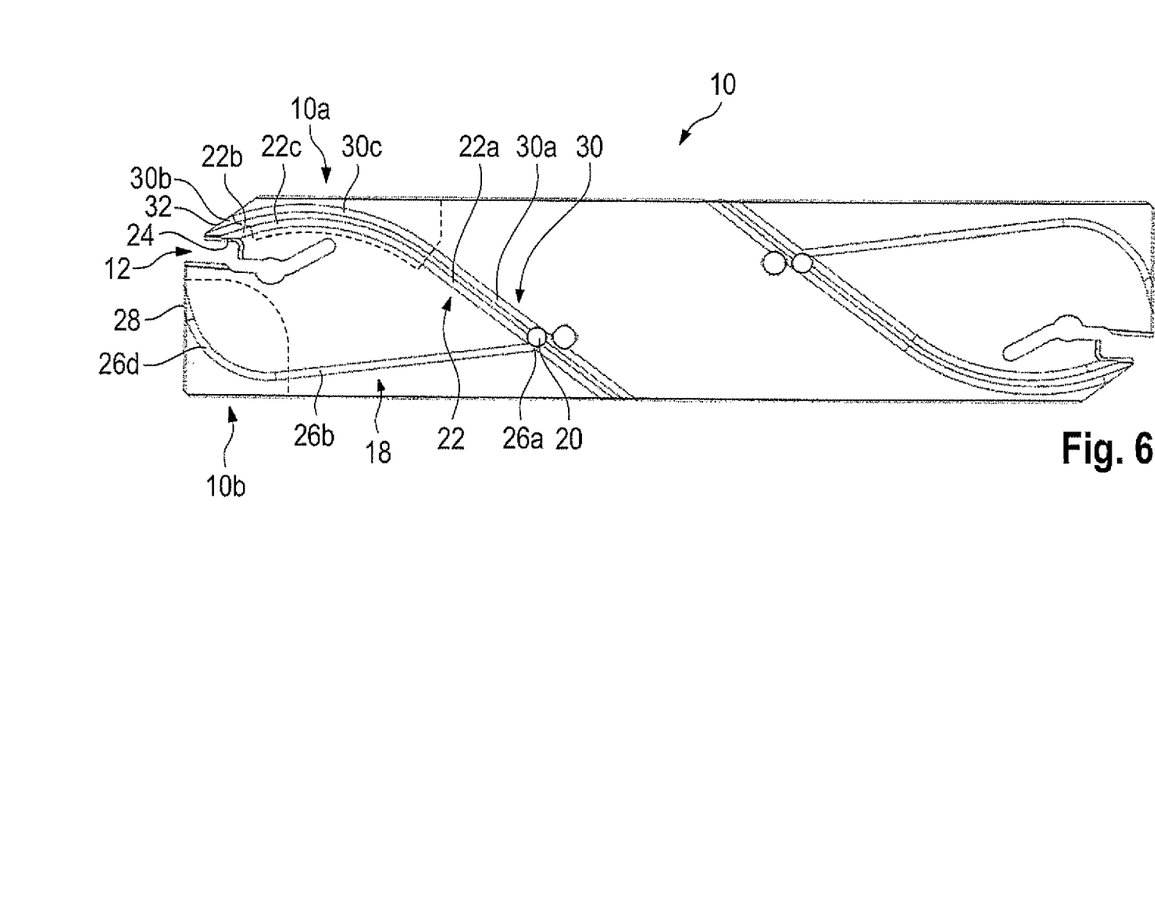
Figure 7:
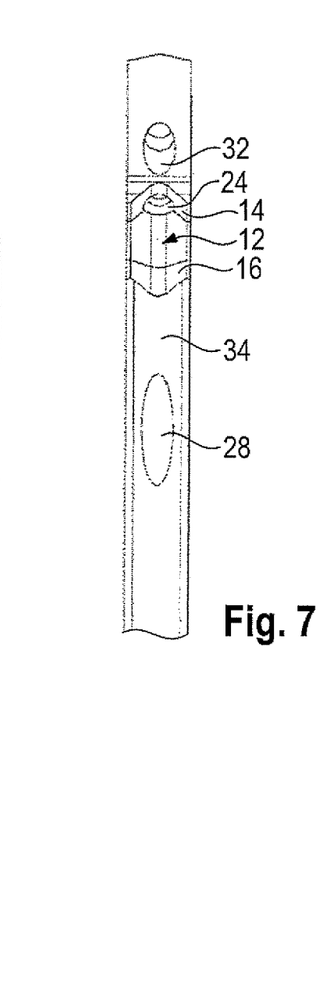
Figure 8:
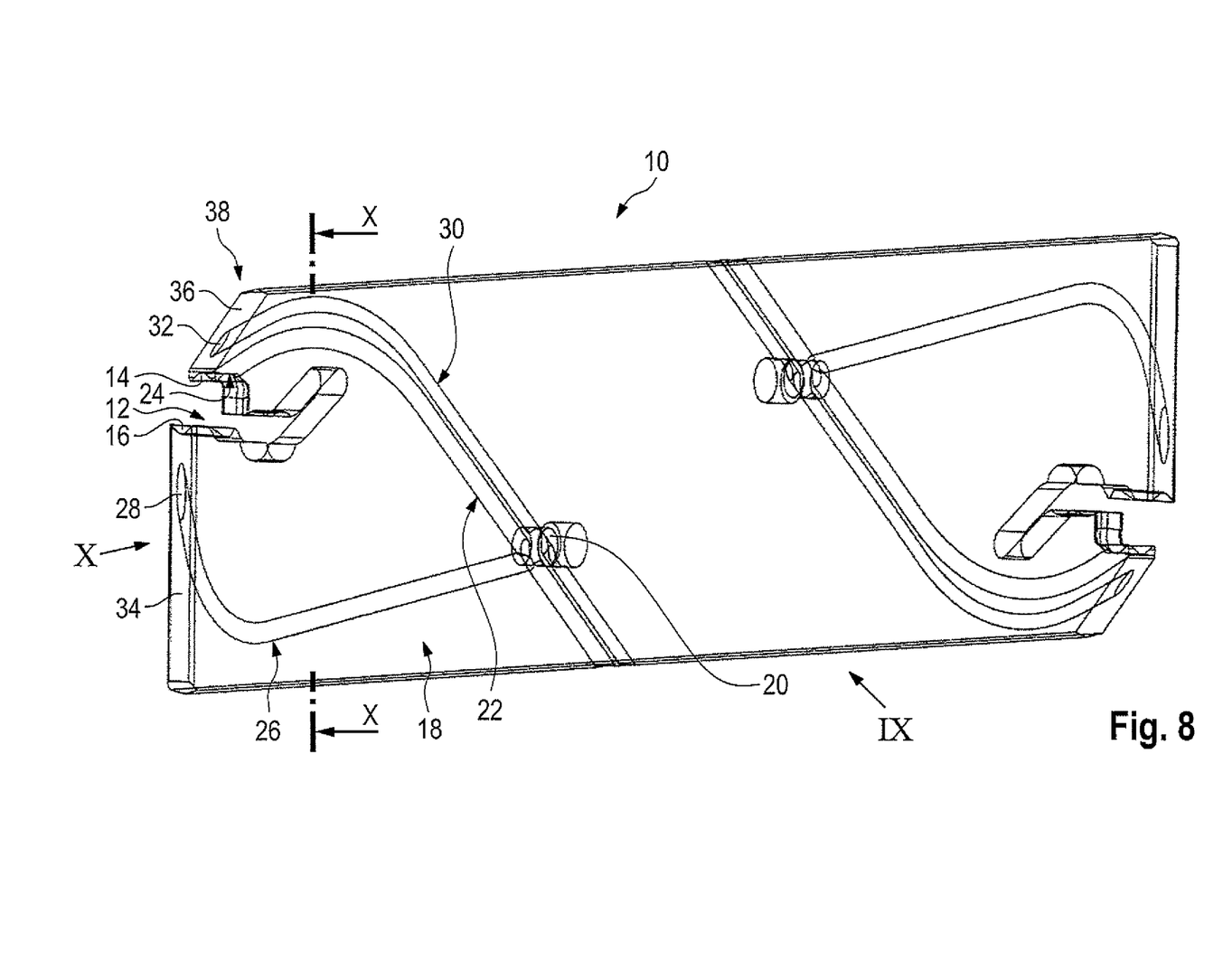
Figure 9:
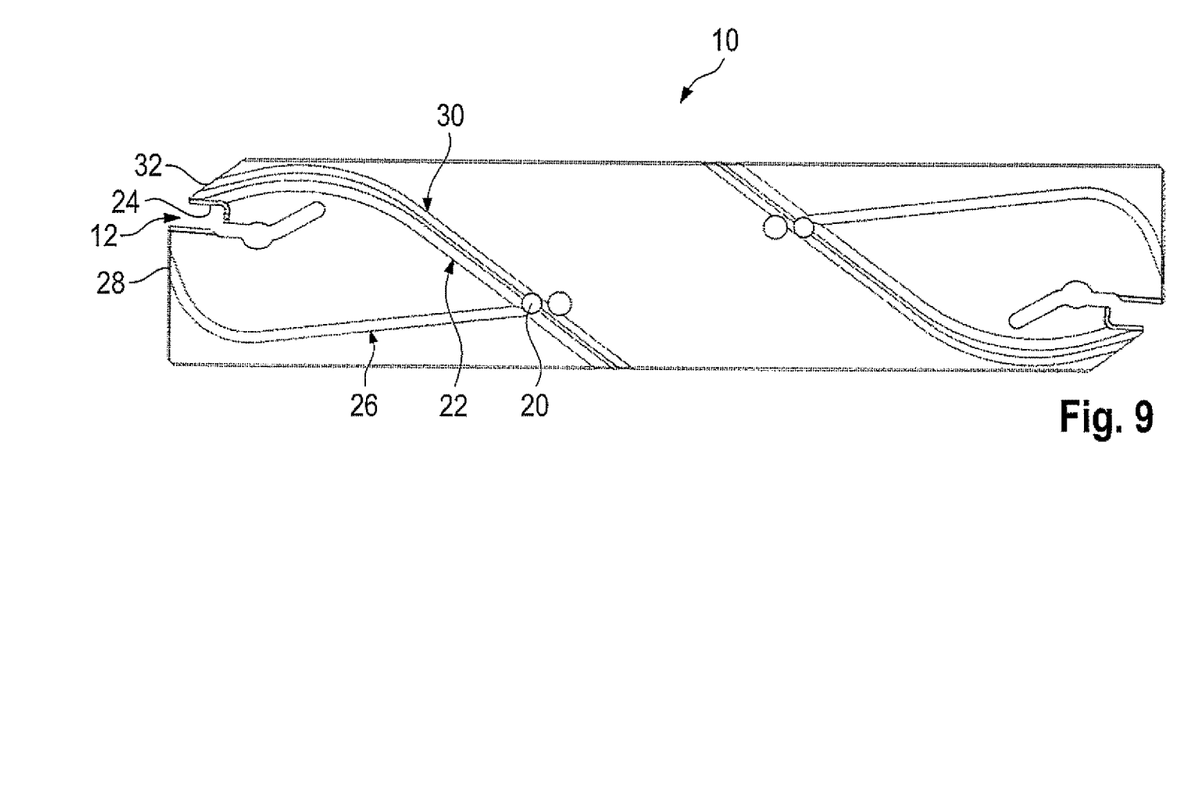

FIGS. 4 to 6 show a second embodiment of the parting lathe tool 10.

Only the differences from the embodiment according to FIGS. 1 to 3 will be addressed in the following.

The parting lathe tool 10 comprises a first section 10a produced by means of a generative manufacturing process, and a second section 10b, also produced by means of a generative manufacturing process.

The linear coolant line sections 22a, 22b of the coolant line 22 are shorter compared with the first embodiment and are connected via a coolant line section 22c.

This is produced by means of a generative manufacturing process and is arcuate, in other words, is not linear. It can also be said that the coolant line section 22c is curvilinear.

The same applies to coolant line 26 in which the coolant line segment 26b is shorter compared with the first embodiment, and the coolant line segment 26c has been replaced by an arcuate coolant line segment 26d.

The coolant line section 26d is also produced using a generative manufacturing process.

In the case of the coolant line 30, the coolant line section 30a and the coolant line section 30b are connected via an arcuate coolant line section 30c which is produced using a generative manufacturing process.

In the illustrated embodiment, the coolant line sections 22c, 30c, 26d running within the generatively produced sections 10a, 10b of the parting lathe tool 10 are produced with a substantially circular cross-section.

The parting lathe tool can even be produced in its entirety by the generative manufacturing process. In that case, all of the coolant line sections 22a, 22b, 22c, 22c, 26a, 26b, 26c, 26c, 26d, 30a, 30b, 30c are manufactured generatively.

Alternatively, in other embodiments, coolant line sections other than those in the embodiment according to FIGS. 4 to 6 can also be manufactured by means of a generative manufacturing process.

Analogous to the variant of the first embodiment shown in FIG. 4, in a variant, not shown, of the second embodiment, the coolant line sections 22a, 30a and/or the coolant line sections 22c, 30c are designed as a single coolant line section which, at a certain distance from the coolant supply port 20, branches off into the coolant line sections 22b, 30b. Here, the branch can lie within the region of the coolant line sections 22a and 30a or in the region of the coolant line sections 22c and 30c. In other words, the coolant outlets 24, 32 are supplied with coolant via a common coolant line.

As in the first embodiment, the parting lathe tool 10 shown is designed as a so-called indexable tool. Again, only one clamping seat 12 and one coolant supply system 18 are described.

FIGS. 7 to 11 show a third embodiment of the parting lathe tool 10.

Only the differences from the embodiment according to FIGS. 4 to 6 will be addressed in the following.

The course of the coolant lines 22, 26, 30 is substantially identical to the second embodiment. However, in the third embodiment, the cross-sections of the coolant lines 22, 26, 30 are elliptical in form (see FIGS. 10 and 11).

Figure 10:
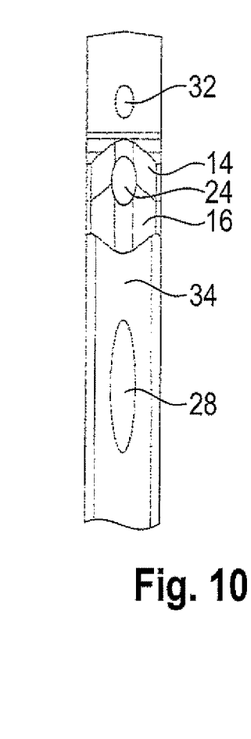
Figure 11:
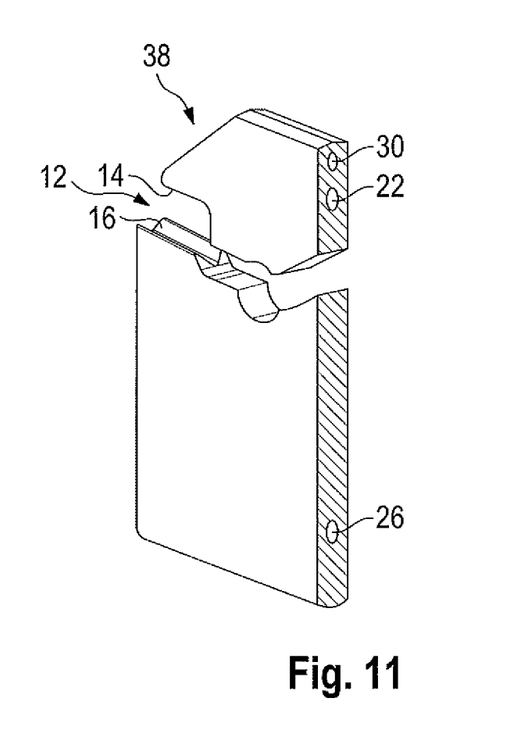
Figure 12:
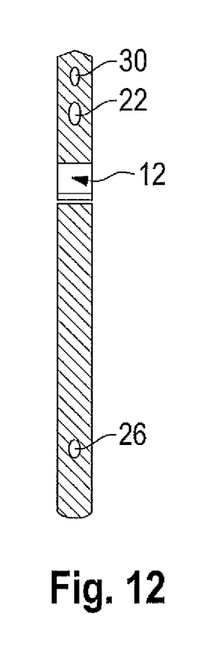

In this case, the parting lathe tool 10 is produced in its entirety by means of a generative manufacturing process. Accordingly even the coolant lines 22, 26, 30 are produced in their entirety by a generative manufacturing process.

In this way, other, almost arbitrary cross-sectional shapes of the coolant lines 22, 26, 30 can also be realized, such as polygonal cross-sections.

In a variant not shown here analogous to the variant shown in FIG. 4 of the first embodiment, the coolant lines

22, 30 are designed as a single coolant line which at a certain distance from the coolant supply port 20 branches off and is thus fluidically connected to the two coolant outlets 24, 32. In other words, the coolant outlets 24, 32 are supplied with coolant via a common coolant line.

All of the parting lathe tools 10 described have the form of parting-off blades. However, the above remarks also apply in an analogous manner to parting lathe tools 10 with an substantially rectangular tool shank.

The invention claimed is:

1. A parting lathe tool for machining metal, comprising: a clamping seat for receiving a cutting insert; and an internal coolant supply system supplying a cutting zone with coolant, the internal coolant supply system comprising: a first coolant line, a second coolant line and a third coolant line running within the parting lathe tool, a coolant supply port defined by an opening through which coolant first enters the parting lathe tool, a first coolant outlet directly connected to the coolant supply port via the first coolant line extending within the parting lathe tool from the coolant supply port to the first coolant outlet, a second coolant outlet directly connected to the coolant supply port via the second coolant line extending within the parting lathe tool from the coolant supply port to the second coolant outlet, and a third coolant outlet directly connected to the coolant supply port via the third coolant line extending within the parting lathe tool from the coolant supply port to the third coolant outlet.

2. The parting lathe tool according to claim 1, wherein the first coolant outlet is positioned on a clamping face of the clamping seat.

3. The parting lathe tool according to claim 2, wherein the first coolant outlet is fluidically connected to a coolant inlet of a cutting insert.

4. The parting lathe tool according to claim 1, wherein the second coolant outlet is positioned on a workpiece-side end face of the parting lathe tool.

5. The parting lathe tool according to claim 4, wherein the second coolant outlet is positioned below the clamping seat in a mounted state of the parting lathe tool.

6. The parting lathe tool according to claim 1, wherein the third coolant outlet is positioned on an angled portion of a clamping lug rearward from a workpiece-side end face of the clamping lug of the clamping seat.

7. The parting lathe tool according to claim 6, wherein the third coolant outlet is positioned above the clamping seat.

8. The parting lathe tool according to claim 1, wherein an indexable cutting insert is positioned in the clamping seat.

9. The parting lathe tool according to claim 1, wherein the parting lathe tool is a parting lathe blade.

10. The parting lathe tool according to claim 1, further comprising a tool shank having a rectangular or square cross-section.

11. The parting lathe tool according to claim 1, wherein the first, second and third coolant lines each comprise a linear section having a circular cross-section.

12. The parting lathe tool according to claim 1, wherein the first, second and third coolant lines are produced using a generative manufacturing process.

13. The parting lathe tool according to claim 12, wherein the first, second and third coolant lines produced using a generative manufacturing process each have a non-circular cross-section.

14. The parting lathe tool of claim 1, wherein the coolant supply port is positioned on a side surface of the parting lathe tool.

15. A parting lathe tool for machining metal, comprising: a clamping seat for receiving a cutting insert; and an internal coolant supply system supplying a cutting zone with coolant, the internal coolant supply system comprising: a first coolant line, a second coolant line and a third coolant line running within the parting lathe tool, a first coolant outlet directly connected to a coolant supply port via the first coolant line extending within the parting lathe tool from the coolant supply port to the first coolant outlet, a second coolant outlet directly connected to the coolant supply port via the second coolant line extending within the parting lathe tool from the coolant supply port to the second coolant outlet, and a third coolant outlet directly connected to the coolant supply port via the third coolant line extending within the parting lathe tool from the coolant supply port to the third coolant outlet,
wherein the first coolant outlet is positioned on a clamping face of the clamping seat and is fluidically connected to a coolant inlet of a cutting insert.

* * * * *